Patented Nov. 10, 1925.

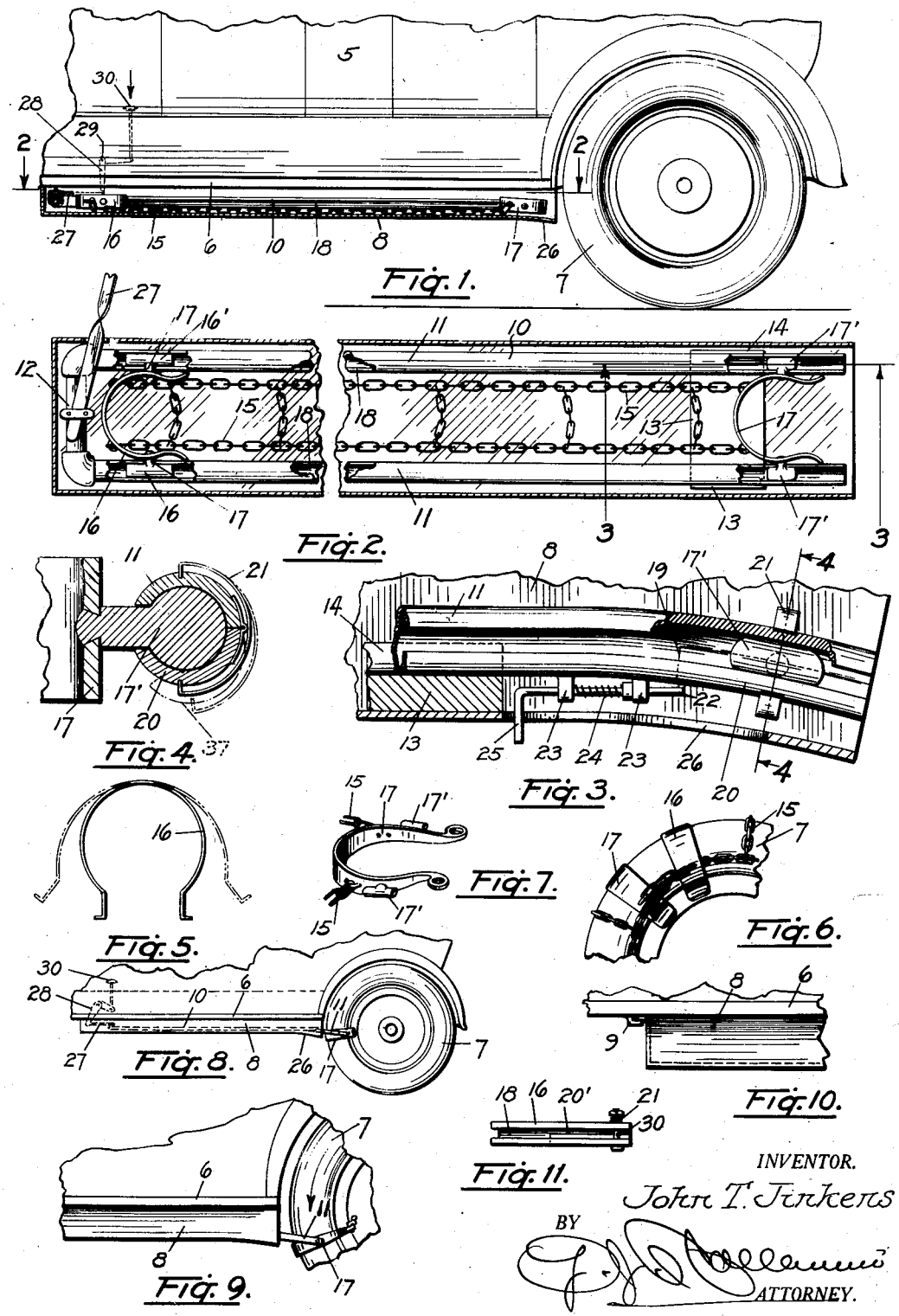

1,561,080

UNITED STATES PATENT OFFICE.

JOHN T. JINKENS, OF BROOMFIELD, COLORADO, ASSIGNOR, BY DIRECT AND MESNE ASSIGNMENTS, TO C. S. MOLHOLM AND FRED HARVEY, BOTH OF BROOMFIELD, COLORADO, AND KENSMA COMPANY, OF LONGMONT, COLORADO, A CORPORATION OF COLORADO.

ANTISKID-CHAIN CARRIER AND APPLIER FOR MOTOR VEHICLES.

Application filed February 23, 1923. Serial No. 690,692.

*To all whom it may concern:*

Be it known that I, JOHN T. JINKENS, a citizen of the United States, residing at Broomfield, in the county of Boulder and State of Colorado, have invented certain new and useful Improvements in Antiskid-Chain Carriers and Appliers for Motor Vehicles, of which the following is a specification.

The primary object of my said invention resides in the provision of an anti-skid chain carrier and applier for motor vehicles, wherein means are provided for carrying the usual anti-skid chains of the vehicle, together with means for applying the chains to the vehicle wheels, while the car is in motion, the invention being characterized by its simplicity of construction, and expeditiousness in the manner in which the said chains are applied to the wheels.

A further object of my invention is the provision of such a device that may be readily installed upon practically all types of motor vehicles, with which I am now familiar, it being of course understood that the different elements of my invention must necessarily be enlarged or reduced to meet the requirements of vehicles employing varying sizes of tires.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Fig. 1 is a fragmentary side elevational view of a conventional form of motor vehicle, the chain carrier being shown in section, whilst the applying mechanism is shown in side elevation.

Figure 2 is a horizontal sectional view taken on line 2, 2 of Figure 1.

Fig. 3 is an enlarged fragmentary sectional view upon the line 3—3 of Fig. 2.

Fig. 4 is a detailed cross sectional view upon the line 4—4 of Figure 3.

Fig. 5 is an enlarged elevational view of one of the spring clip members carried by the opposite ends of the chains employed in conjunction with my invention.

Fig. 6 is a fragmentary elevational view of a vehicle wheel, showing my chain in position thereon.

Fig. 7 is a perspective of one of the end members, of the said chains employed in conjunction with the invention.

Fig. 8 is a view similar to Figure 1, disclosing the chain in the act of being applied to its corresponding wheel of the motor vehicle.

Fig. 9 is a fragmentary enlargement of Figure 8.

Fig. 10 is a fragmentary elevational view of one of the chain carriers, disclosing more clearly, the manner of supporting the same from the running boards of a motor vehicle, and Fig. 11 is a fragmentary elevational view of one of the arms of a modified form of chain projecting member.

Referring to the drawing in detail, 5 designates a motor vehicle body, 6 one of the running boards of the vehicle and 7 one of the rear wheels thereof.

Upon each of the running boards 6 of the vehicle, and in longitudinal alinement therewith, is a metallic casing 8, the rear end of which is open, and inclined downwardly, as more clearly shown in Figures 1, 2, 8, and 9, it being understood that the open ends of these casings are slightly forwardly of each of the rear wheels 7 of the motor vehicle. These casings 8 are preferably supported beneath the running boards by a suitable form of bracket 9, Figure 10.

Within each of these casings 8 and arranged longitudinally therein are sliding chain carriers designated in general by the numeral 10, each of the same including a pair of hollow rods 11 secured at one end by a cross member 12 and being slightly curved downwardly at their opposite ends as more clearly shown in Figure 1, these ends being supported above the bottom wall of the said casing 8 by a block 13, the same being formed with channel guides 14, Figure 3.

The anti-skid chains employed in conjunction with the invention may be of any desirable form, the chains shown in the drawing being designated at 15 and carrying at its opposite ends spring clips 16 and 17 respectively, it being understood that the nature of the same are such as to forcibly engage over upon the tires of the rear wheels of the vehicle and to remain thereon until manually removed from the tires.

The hollow rods 11 are each slotted upon their inner adjacent sides as at 18 and engaging within these slots are heads 16' and 17' of the spring clips 16 and 17, respectively, it being noted that the distance between the hollow rods 11 constituting the chain projecting member 10 is such as to normally maintain the said clips in an outward sprung position.

The ends of the hollow rods 11 adjacent the wheels of the vehicle are cut out as at 19, and within these cut out portions are hinged sections 20, normally in the position more clearly shown in Figures 3 and 4, these sections being maintained in the dotted line position of Figure 4, through the instrumentality of band springs 21. The said sections 20 are maintained in their full line or closed positions as per said Figure 4, through the instrumentality of sliding latch bolts 22, these bolts being slidably disposed within bearings 23, formed upon each of the hollow rods 11 constituting the member 10. Referring particularly to Figure 3, these latch bolts 22 have their front ends normally extended beneath the adjacent ends of the said hinged section 20, through the instrumentality of coiled springs 24.

The ends of these latch bolts 22 are formed with pendent arms 25 extending through slots 26 in the said casing 8.

Loosely connected at one end to the connecting member 12 of the hollow rods 11, is an arm 27, the laterally extending end of this arm being similarly connected to one arm of a bell crank 28. This bell crank is pivoted beneath the foot board of the motor vehicle as at 29, and is provided with a foot pedal 30, it being at once understood that when this foot pedal is depressed, the respective chain carrier 10 will be forced rearwardly for consequently carrying therewith the anti-skid chain 15. Upon a rearward movement of one of the carriers 10, the hollow rods 11 constituting the carrier will engage over the sides of the wheel tires in a manner clearly shown in Figures 8 and 9. Upon being forced rearwardly and after the ends of the arms 11 have engaged over the sides of the tire, these ends carrying the spring clip 17, the sliding latch bolt 22 will be retracted for permitting the sections 20 to swing to the open dotted line position of Figure 4, for consequently allowing this spring clip to disengage from the carrier, at which time, the same will spring into position upon the tire. After the first clip has become engaged around the tire, the chain will be retracted from the carrier 10, at which time, the opposite spring clip 16 will engage around the tire in a manner similar to the first clip.

In the rearward sliding movement of the chain projecting member 11 the ends of the hollow rods extend on either side of the tire casing 7 to a position opposite the periphery of the rim, in order to provide for the engagement of the clip 17 around the casing, after which the frictional engagement, between the clip 17 and the casing 7 will effect a movement of the sections 20 about their pivots against the tension of the spring for permitting the movement of the member 17 out of the guideways or rods and the subsequent application of the chain to the casing, the same action taking place as the clip 16 engages the tire.

In Figure 11, I have shown one of the hollow rods 11 forming the chain carrier 10 as being also with a hinged insert 20'. In this instance however, the means for normally extending this insert away from its corresponding hollow rod is in the form of a coiled spring 21' surrounding one end of a bolt 30, this bolt extending transversely of the insert 20' as well as the corresponding hollow rod 16.

In view of the above description, it is believed by me that the advantages and operation of a device of this character will be readily appreciated by those skilled in the art, and while I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent is:

1. The combination with a vehicle of a casing supported at one side thereof, parallel hollow rods in the casing, heads slidable in the rods, an anti-skid chain carried by the heads, and means for moving the hollow rods longitudinally.

2. An anti-skid chain applying device comprising a pair of hollow rods supported upon one side of a vehicle, heads slidable in the rods, resilient U-shaped elements carried by the heads and adapted to engage a tire shoe, an anti-skid chain carried by the U-shaped elements, and means for moving the hollow rods longitudinally.

3. An anti-skid chain applying device comprising a pair of hollow rods supported upon one side of a vehicle, heads slidable in the rods, resilient U-shaped elements carried by the heads and adapted to engage a tire shoe, an anti-skid chain carried by the U-shaped elements, means for moving the hollow rods longitudinally, and hinged end sections provided in the hollow rods for detachably holding the heads in the hollow rods, whereby the end sections permit the disengagement of the U-shaped elements from the rods after engagement with the tire.

4. A device of the class described including a chain projecting member slidably mounted on a motor vehicle, chain carrying elements slidably mounted in said member and adapted for engagement with a tire casing for applying and holding the chain thereon, and operating means for said chain projecting member adapted to slide it relative to the tire casing for applying the chain carrying elements and the chains to the tire.

5. A device of the class described including a chain projecting member slidably mounted on a motor vehicle in proximity to the wheel thereof and adapted for projection on each side of said wheel, chain carrying elements slidably mounted in said member and adapted for engagement with the tire casing carried by the wheel for application thereto to hold the chain carried by said elements on the tire, operating means for said chain projecting member adapted to slide said member to position the ends thereof at each side of the tire casing for applying the chain carrying elements thereto, and hinged sections formed in the projecting member at the ends thereof for permitting the disengagement of the chain carrying elements from said member after application to the tire casing.

In testimony whereof I affix my signature.

J. T. JINKENS.